(No Model.)
L. B. PLIMPTON.
ENVELOPE.
No. 282,920. Patented Aug. 7, 1883.
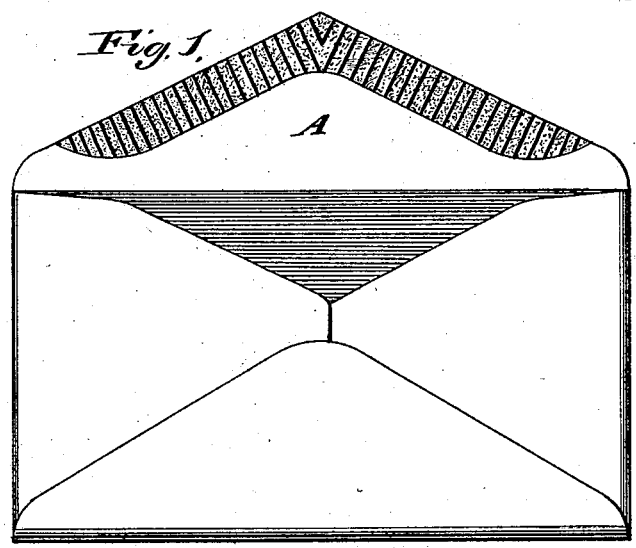
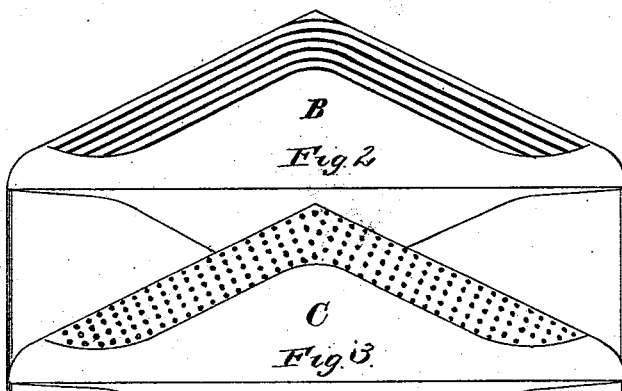
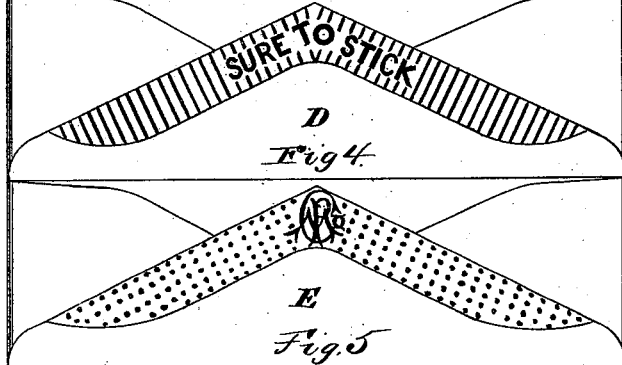
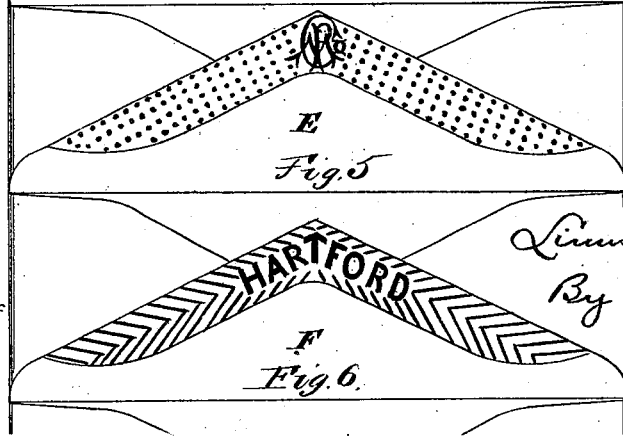
Witnesses.
A. Ruppert.
Geo. D. Seymour.
Inventor.
Linus B. Plimpton
By H. A. Seymour
Attorney

UNITED STATES PATENT OFFICE.

LINUS B. PLIMPTON, OF HARTFORD, CONNECTICUT.

ENVELOPE.

SPECIFICATION forming part of Letters Patent No. 282,920, dated August 7, 1883.

Application filed August 4, 1882. (No model.)

*To all whom it may concern:*

Be it known that I, LINUS B. PLIMPTON, of Hartford, in the county of Hartford and State of Connecticut, have invented a certain new and useful Improvement in Envelopes; and I do hereby declare the following to be a full, clear, and exact description of the invention, such as will enable others skilled in the art to which it pertains to make and use the same.

My invention relates to an improvement in envelopes, and more particularly to a novel distribution of gum upon the flaps thereof, the object being to render the flaps of more certain adhesion, and to prevent them from curling.

With these objects in view my invention consists in an envelope having its flap provided with dried gum distributed in ridges, or in equivalent form.

In the accompanying drawings, Figure 1 is a plan view of an envelope having gum applied to its flap in the form of ridges extending transversely across it and separated by thinly-gummed spaces. Fig. 2 is a similar view, showing the gum distributed in ridges running parallel with the edge of the flap. Fig. 3 is a view showing the gum applied in the form of dots. Fig. 4 is a view showing the gum applied in the form of transverse ridges and of words. Fig. 5 is a view showing the gum applied in the form of dots and of a monogram. Fig. 6 is a view showing the gum applied in the form of diagonal intersecting ridges and of a word which is located near the point of the flap.

In prosecuting my invention I employ a gummer the surface of which is appropriately configurated to produce the desired distribution of the gum. If, for instance, it is designed to apply the gum in the form of ridges extending transversely across the flaps of the envelopes, as shown by the envelope A of Fig. 1 of the drawings, the surface of the gummer is provided with transverse grooves. On the other hand, if it is desired to apply the gum in ridges running longitudinally of the flaps, as shown by the envelope B in Fig. 2 of the drawings, the surface of the gummer is provided with suitable grooves. To distribute the gum in the form of dots, as shown by the envelope C in Fig. 3 of the drawings, the surface of the gummer is provided with numerous indentations, while to embody words, monograms, letters, or other designs in the gum, as shown by the envelopes D, E, and F, respectively represented in Figs. 4, 5, and 6 of the drawings, the surface of the gummer is appropriately configurated to produce such results.

The spaces between the ridges or aggregations of gum may be thinly gummed or left ungummed, as found most desirable. By distributing the gum in accordance with my invention the flaps are not only rendered more certain of adhesion, but also prevented from curling.

It is apparent that my invention is not limited to envelopes, but that it is applicable to all styles of wrappers, and to all articles of like nature which are provided with a surface of dried gum.

Having fully described my invention, what I claim as new, and desire to secure by Letters Patent, is—

As a new article of manufacture, an envelope having its flap provided with dried gum distributed in ridges, or in equivalent form, substantially as set forth.

In testimony whereof I have signed this specification in the presence of two subscribing witnesses.

LINUS B. PLIMPTON.

Witnesses:
E. E. MARVIN,
J. F. DONOHUE.